United States Patent [19]

Hatanaka

[11] Patent Number: 4,844,926

[45] Date of Patent: Jul. 4, 1989

[54] EGG LECITHIN PROCESS

[76] Inventor: Hiroji H. Hatanaka, 285 Fifth St., Norco, Calif. 91760

[21] Appl. No.: 58,583

[22] Filed: Jun. 5, 1987

[51] Int. Cl.$^4$ ................................................ A23L 1/32
[52] U.S. Cl. ................................... 426/282; 424/105; 426/98; 426/138; 426/417; 426/520; 426/614
[58] Field of Search ................. 426/614, 282, 98, 520, 426/138, 417; 424/105

[56] References Cited

U.S. PATENT DOCUMENTS 4,219,585  8/1980  Herring ................................. 426/614

*Primary Examiner*—Donald E. Czaja
*Assistant Examiner*—Celine T. Callahan
*Attorney, Agent, or Firm*—G. Donald Weber, Jr.

[57] ABSTRACT

The product is an egg oil which is extracted from eggs, primarily, the yolks of chicken eggs and the method associated therewith to produce a high quality capsule of egg oil (lecithin).

3 Claims, 1 Drawing Sheet

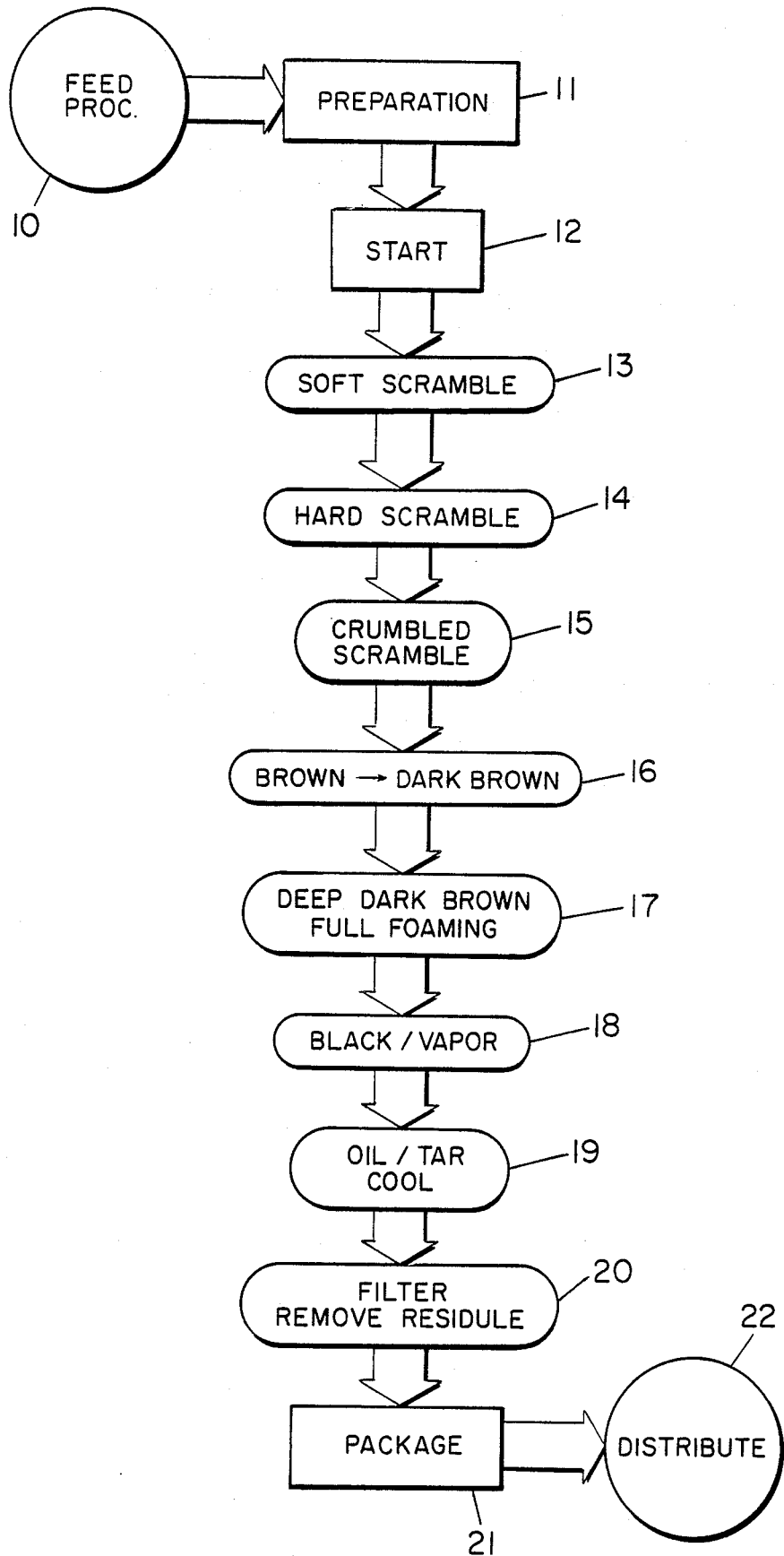

EGG LECITHIN PROCESS

BACKGROUND

1. Field of the Invention.

This invention is directed to an egg oil (lecithin) product, in general, and to a high quality product which is believed to have health improving characteristics, as well as the method of producing same.

2. Prior Art.

In Japan many centuries ago egg oil, or lecithin, was discovered and its use was considered to be a miraculous cure-all. It was believed to be the "number one" medicine for heart ailments as well as physical rejuvenation. Its method of preparation was a closely guarded secret that was passed from person to person as a family secret. It was held in high esteem by the feuding Shoguns.

In more recent times, for example, during the period 1910 through 1925, doctors conducted clinical tests and treatments on cardiac patients utilizing egg oil (lecithin). These doctors reported the treatment a success and concluded that the family secret was in line with modern medicine and not an unfounded myth from the past.

The word "lecithin" is derived from the Greek word "lekithos" meaning egg yolk. As the name implies, lecithin is extracted from whole egg yolks and contains such nutrients as vitamins A, B1, B2, E and D; minerals including calcium, iron and phosphorous; and compounds including taurine and methionine. Its use as a dietary supplement is reported to confer the following health benefits:

1. Improves brain and nerve function. Lecithin, in addition to egg yolks, is found in brain and nerve tissue and is reported to be a factor in retarding premature aging and senility.

2. Body rejuvenation. Smooths and tones the skin and improves internal functions and sexuality (Vitamin E).

3. Improves blood circulation. Contains such essential substances as linoleic, oleic and linolenic acids which are reportedly factors in improvement and/or prevention of such conditions as arteriosclerosis and hypertension.

Many people have concerns about eggs and cholesterol. Generally, it has been learned that eggs are a food that will not necessarily raise cholesterol. That is, there are two kinds of cholesterol, viz. HDL and LDL cholesterol. LDL cholesterol is the type which attaches to blood vessel walls. However, eggs contain HDL cholesterol which will disintegrate the LDL cholesterol and lecithin, thereby allowing the body to eliminate this material as waste, thus cleansing the blood.

Most of the foregoing benefits listed are treated in Dr. Mutsuo Yamaguchi's publication "TAMAGO ABURA NO KOYO" ("VIRTUES OF EGG OIL LECITHIN") reference to which is made for further particulars. This discussion was published by Kenji Fukushima and Health Kenkyusho Company in 1985.

SUMMARY OF THE INVENTION

A pure natural food product is made by processing of eggs, notably, chicken eggs. In particular, the processing includes the rendering, reducing, and treating of egg products, especially egg yolks, in order to produce the product. In one embodiment, the product is named "GOSHIN BODY GUARD" (or GOSHIN). This product is fabricated by using a unique method of processing the egg lecithin in order to provide the best quality product at the lowest price.

The process is a specially developed process which is believed to provide the maximum return of product based upon the input ingredients. In addition, the process is believed to be the most effective and efficient in producing the high quality, high yield product.

The product, as produced by the process, is enhanced by controlling a specially formulated feed which is supplied to the egg producing hens, in order to enhance the quality of the egg lecithin obtained.

The ultimate product is combined, in a conventional fashion, with a gelatin-type capsule for easy ingestion. Other types of packaging are contemplated, as well.

BRIEF DESCRIPTION OF THE DRAWINGS

The sole Figure is a block diagram of the process utilized in the instant invention.

DESCRIPTION OF PREFERRED EMBODIMENT

Referring now to the sole Figure, there is shown a flow chart which is representative of the process involved in the instant invention.

Inasmuch as the process relates to a product made from eggs, typically but not limited to, chicken eggs, the process can be considered to begin with the provision of appropriate or preferred feed to the fowl which provide the eggs. The feed process 10 can be important insofar as controlling the quality and quantity of lecithin in the egg produced by the fowl. In the instant application, a proprietary feed product is supplied. This feed product is, in fact, a trade secret of and belonging to Applicant. Suffice it to say that, within certain natural limitations, so long as the fowl are fed, they will produce eggs. By controlling the feeding process, the quality and quantity of eggs and, thus, the by-product described herein can be enhanced.

The eggs are then prepared in preparation stage 11. This can include gathering of the eggs, cleaning of the eggs, if appropriate, cracking and separating of the eggs. That is, in a preferred embodiment, the invention is directed to a product made only of the yellow or yolk portion of the eggs. In this case, the eggs must be separated and the yoke portion retained while the egg whites are disposed of. It is expected that the egg whites will produce a separate by-product in the future.

The start stage 12 is representative of the placing of the yolks of the eggs into a suitable vessel for operation thereon. In particular, a stainless steel cooking vessel is used. In the basic or rudimentary arrangement, the vessel is an open pan. However, in other operations a closed vessel or even a pressurized vessel can be utilized advantageously to retain the desirable characteristics of the product and/or to speed the operation of the process.

At step 13, the egg mixture is still in the raw state and is placed into the vessel. The mixture is then heated to 150° F. for five (5) minutes. The yolk mixture is lightly stirred at this time to produce a soft scrambled egg consistency. By mixing and stirring the mixture, the consistency thereof is maintained throughout.

At stage 14, heat is gradually applied until, after fifteen (15) minutes the mixture is at 180° F. The mixture is then heated to 200° F. for thirty (30) minutes. Again, the mixture has been mixed or scrambled in order to maintain consistency throughout. At this time the mixture has the appearance of a hard, scrambled egg characteristic.

At stage 15, the heat is reduced 10° F. for thirty (30) minutes until the mixture achieves a crumbled, scrambled appearance and has changed color from yellow to brown. In addition, the quantity of the material has been slightly reduced inasmuch as certain moisture has been driven off by the heating operation. At the end of this stage the mixture product will start to develop a foaming consistency. The foaming is believed to be the effect of driving off additional moisture in the product.

As indicted at stage 16, the product is maintained at the same temperature for fifteen (15) minutes. The color of the product changes to dark brown while the product continues foaming. As a result of the foaming action, the temperature of the product has been reduced to 180° F. After another fifteen (15) minutes, the product is about 80% foaming.

At stage 17, the product becomes deep, dark brown and has totally changed its characteristic to a creamy foam. The mixing or stirring operation continues for fifteen (15) minutes while maintaining the temperature.

As shown in stage 18, the temperature of the product has elevated gradually to 200° F. in fifteen (15) minutes. At the end of this time period, the product has assumed a black or nearly black color. In addition, the product at this time begins to smoke or give off vapors which are believed to be the residual moisture which remains after the foaming action in steps 16 and 17.

The temperature in stage 19 is maintained for thirty (30) minutes. This operation has the effect of splitting the product into the oil and solid components thereof. The solid component has the appearance of a tar or a tar-like material, which, essentially, floats on the surface of the oil component. This tar-like material is removed and discarded.

At this point, the oil component of the product is removed from the elevated temperature and is permitted to cool for handling. In particular, the liquid or oil is filtered through a stainless steel screen into a stainless steel container. This liquid product is stored at 55° F. for about twelve (12) hours.

By stage 20 the liquid product is cool enough for further filtration to remove any remaining residue therefrom. The product is, typically, filtered three (3) times with fine cloth, then transferred to a plastic container for shipment to the encapsulation operation shown at stage 21. This packaging can be in the form of tablets, capsules, or in the preferred embodiment, a gelatin type ampule. The packaging can then proceed in terms of boxes, vials, or the like.

From the packaging stage, the product is then distributed in the distribution stage 22 in the usual manner.

In one process, a dozen whole eggs were used in performing the test. In this instance, the dozen whole eggs weighed 23.4 ounces while the yolks thereof, when separated from the eggs, weighed 7.6 ounces. The yolks, in liquid form, represented approximately ½ pint of material. From this input, the finished product produced approximately one (1) ounce of useful liquid or oil product.

In another test, ten dozen whole eggs were used. In this case, the weight of the eggs was 234 ounces or 14.63 pounds. The yolks, when separated from these eggs, weighed approximately 76 ounces or 4.75 pounds. When this product was run through the process, a finished liquid product of approximately 10 ounces was obtained.

This latter test confirmed the reproducibility of the first process by producing a similar percentage of output product based upon the input materials.

Thus, there is shown and described a process for producing an egg-based product comprising largely egg lecithin. The process which is shown and described is a preferred embodiment and is believed to be appropriate. The recommended usage of the product as a dietary supplement is one (1) capsule after breakfast and two (2) capsules at evening meals. However, other dosages can be used by persons with different physiological make-ups as their conditions indicate. After continued use of this product for at least 3 to 4 months, it is generally reported that a person will feel a difference in himself and his well-being.

GOSHIN is a pure natural food and should not cause any undesirable side effects. The hens which produce the eggs from which the yolks are extracted are fed a specially formulated feed to enhance the quality of the egg lecithin. In one informal test, it has been found that after using "GOSHIN" now for more than a year, blood pressure and cholesterol are reduced; hair color is returned to nearly its natural color; constipation has been relieved; the test subjects have more energy; and because of skin becoming smoother, the test subjects look younger. Of course, the benefits may vary from user to user and are not to be considered as guaranteed under this description. Also, the guidance and supervision of a physical is always recommended.

This description recites a preferred embodiment of the invention. It is contemplated that modifications to this process may be suggested to those skilled in the art. However, any such modifications which fall within the purview of this description are intended to be included therein as well. This description is intended to be illustrative only and is not intended to be limitative. Rather, the scope of the invention is limited only by the claims appended hereto.

I claim:

1. The process of making an egg-based product adapted for internal consumption by human comprising the steps of:

separating the yolk portion of an egg from the remainder of the egg;

heating the separated yolk portion in a plurality of steps each of which is characterized by time and temperature limits to remove substantially all of the moisture therefrom and to produce an oil which is retained as the egg-based product;

said plurality of steps include:

a first heating step wherein the separated yolk portion is heated to about 150° F. for 5 minutes while being lightly stirred;

a second heating step wherein the separated yolk portion is heated to about 200° F. for 30 minutes while being lightly stirred;

a third heating step wherein the separated yolk portion is heated to about 190° F. for 30 minutes;

a fourth heating step wherein the separated yolk portion is heated to about 200° F. for 15 minutes while being lightly stirred;

a filtering step wherein the separated yolk portion is passed through at least one filtration means after all of said heating steps; and a cooling step wherein the separated yolk portion is cooled to approximately room temperature after said filtering step.

2. The process recited in claim 1 including, cooling said oil prior to the filtering step.

3. The process recited in claim 1 including, encapsulating said oil which is retained in a gelatin ampule.

* * * * *